United States Patent [19]

Jackson

[11] 4,315,308

[45] Feb. 9, 1982

[54] INTERFACE BETWEEN A MICROPROCESSOR CHIP AND PERIPHERAL SUBSYSTEMS

[75] Inventor: Daniel K. Jackson, Portland, Oreg.

[73] Assignee: Intel Corporation, Santa Clara, Calif.

[21] Appl. No.: 972,007

[22] Filed: Dec. 21, 1978

[51] Int. Cl.³ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,739,352 | 6/1973 | Packard | 364/200 |
| 3,786,436 | 1/1974 | Zelinski et al. | 364/200 |
| 3,931,615 | 1/1976 | Oliver et al. | 364/900 |
| 4,144,562 | 3/1979 | Cooper | 364/200 |
| 4,145,751 | 3/1979 | Carlow et al. | 364/900 |
| 4,156,931 | 5/1979 | Adelman et al. | 364/900 |
| 4,172,283 | 10/1979 | Kober | 364/200 |
| 4,183,084 | 1/1980 | Lawson | 364/200 |
| 4,209,838 | 6/1980 | Alcorn, Jr. et al. | 364/200 |
| 4,209,841 | 6/1980 | Bambara et al. | 364/200 |

*Primary Examiner*—Gareth D. Shaw
*Assistant Examiner*—David Y. Eng
*Attorney, Agent, or Firm*—Owen L. Lamb

[57] ABSTRACT

An interface between a microprocessor chip and input-/output, and memory modules. The interface uses a single, bidirectional bus comprised of a number of lines which is less than the number necessary to carry a complete address word or a full width data word. Information transfer is effected by transferring information in small portions utilizing two or more interface clock cycles. An encoded control specification placed on the bus during the first cycle of information transfer specifies the type of access, the direction of transfer, and the length (number of bytes) of data to be moved. Only two additional simplex lines, one from the microprocessor and the other to the microprocessor are needed to complete the basic interface.

9 Claims, 10 Drawing Figures

FIG. 3
CONTROL SPECIFICATION - ACD BITS 15-8

| 15 | 14 | 13 | 12 | 11 | 10 | 9 | 8 |
|---|---|---|---|---|---|---|---|
| ACCESS | DIRECTION | MODIFIER | LENGTH | | | MODIFIERS | |
| 0= MEMORY<br><br>1= OTHER | 0= READ<br><br>1= WRITE | 0= NOMINAL MEM. ACCESS<br><br>1= READ MODIFY WRITE MEM. ACCESS | 000=1BYTE<br>001=2BYTES<br>010=4BYTES<br>011=6BYTES<br>100=8BYTES<br>101=10BYTES<br>110=16BYTES<br>101=20BYTES | | | BIT 15=0<br>00=INST.SEG.ACCESS<br>01=STACK SEG.ACCESS<br>10=CONTEXT CONTROL SEG. ACCESS<br>11=OTHER<br><br>BIT 15=1<br>00=PRI.REG. ACCESS (LENGTH NOM. 2B)<br>01=INTERMODULE TRNS (LENGTH NOM. 2B)<br>10=RESERVED<br>11=NULL | |

FIG. 4
INSTRUCTION UNIT

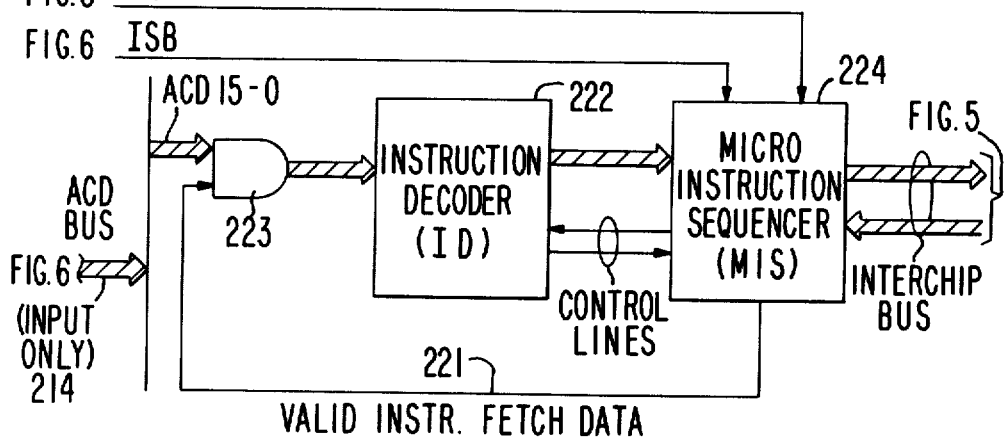

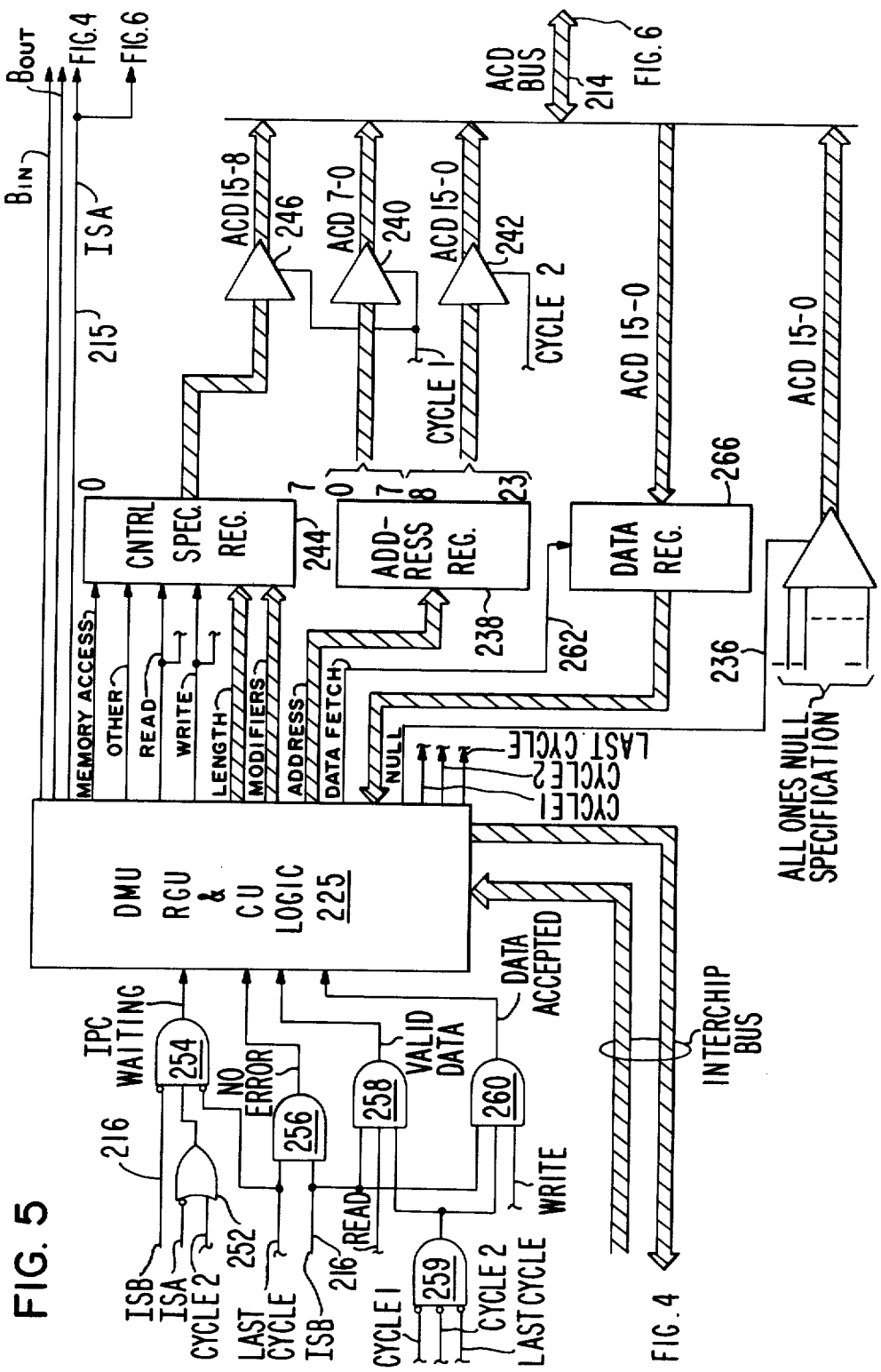

FIG. 6

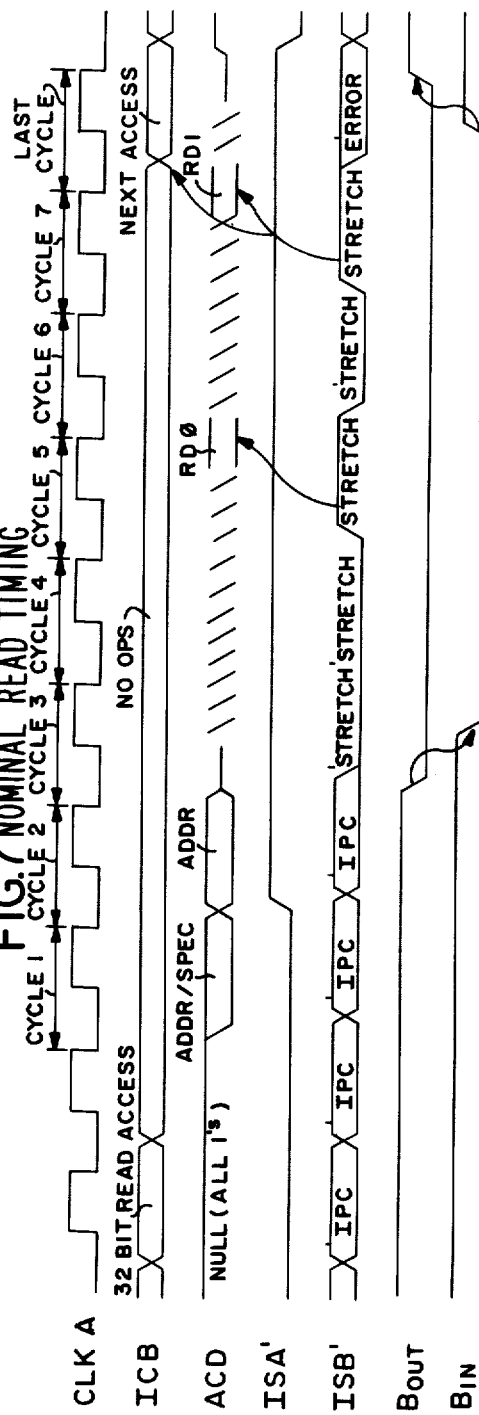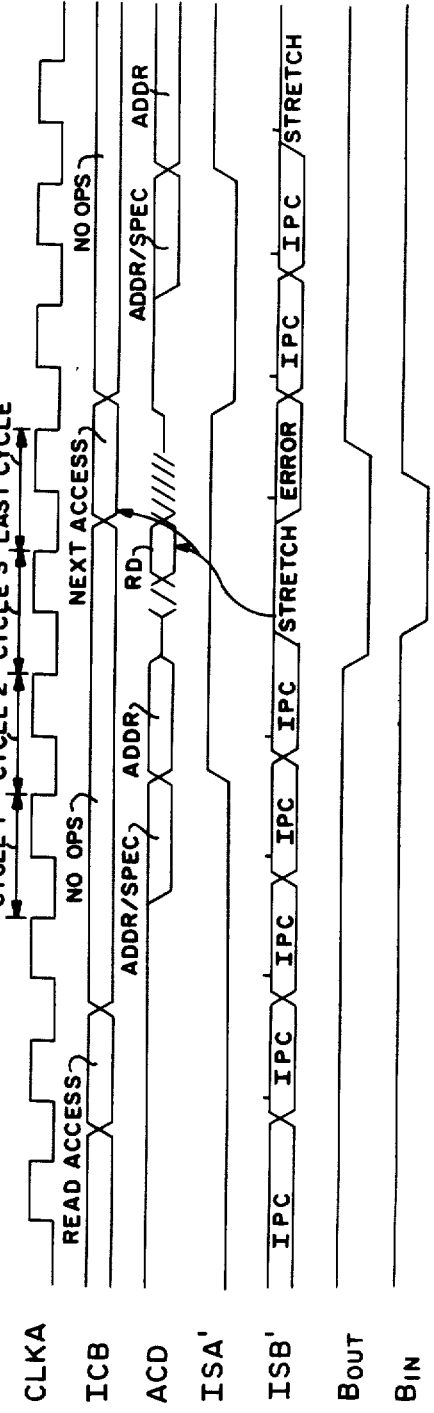

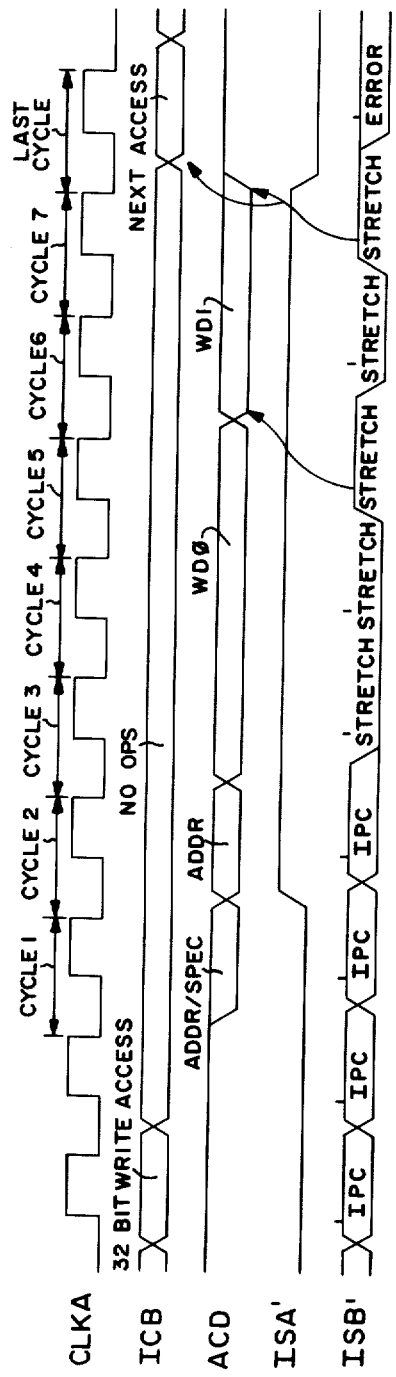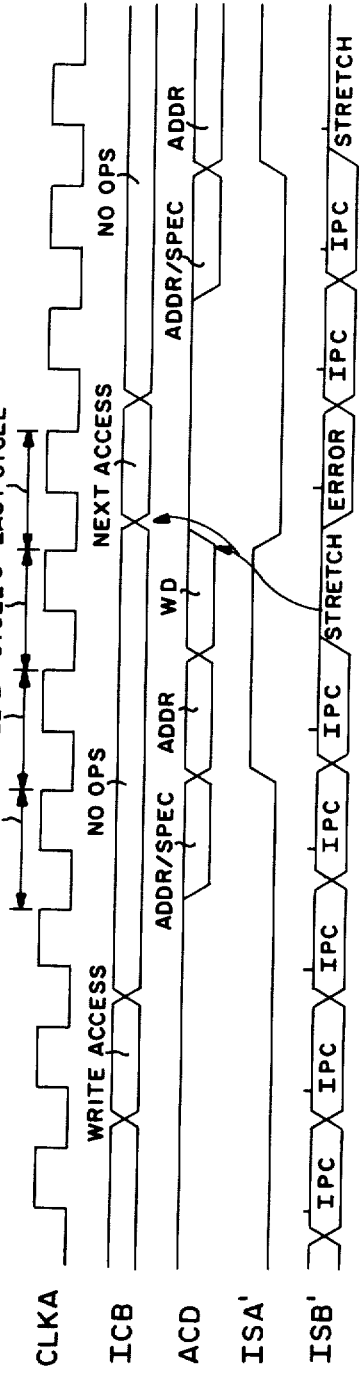

INTERFACE BETWEEN A MICROPROCESSOR CHIP AND PERIPHERAL SUBSYSTEMS

BACKGROUND OF THE INVENTION

1. Field of the Invention

The present invention relates to microprocessors, and more particularly to apparatus for controlling the movement of data off of and onto a microprocessor chip.

2. Description of the Prior Art

Computer systems have in the past been concerned with the movement of digital data between modules in the system. Traditionally, the central processing unit has been packaged separately from memory units and peripheral input/output devices such as disc files, printers, and magnetic tape storage units. Prior to the development of large-scale integration (LSI) technology, the interface between units was mainly concerned with transferring data at the highest speed possible commensurate with the electrical characteristics of the cables between the units and the electronic circuits which drive signals on the cables. An example of such an interface in wide use today is that used on the IBM System/360 computers between input/output devices and the input/output channel of the main processor. This interface is described in U.S. Pat. No. 3,336,582—Interlocked Communication System—Beausoleil et al, filed Sept. 1, 1964, and issued Aug. 15, 1967. This I/O interface provides for a data format and control signal sequence definition which is common to all control units which can be attached to the system. The rise and fall of all signals transmitted over the interface are controlled by corresponding interlocked responses. In such a system there is no practical limit on the number of lines which can be utilized between the units, and, therefore, a separate bus is provided for address information and data information. The width of the data bus is conveniently made equal to the width of data words utilized within the data processing unit. Furthermore, the address bus is made equal to the width of the data word used for address development. The IBM System/360 Interface therefore uses nine lines to represent bus out which is used to transmit data, I/O device addresses, commands, and control orders to the peripheral devices. Furthermore, a separate set of nine lines, bus in, is used to transmit data, selected I/O device identification, status information, and sense data from the peripheral devices. In addition, more than 16 simplex input and output lines are utilized for controlling information on the buses, for special sequences, for the scanning of or selection of attached input/output devices, and for usage meters. A total of over 34 lines are used to control data movement.

The use of such an interface with microprocessors is prohibitive because there are not enough input/output pins available on the LSI package with present-day technology. To solve this problem, microprocessors have to use fewer actual lines interconnecting the modules, but still have the requirement of being able to handle data movement and control operations just as complex as those of previous data processing systems. This has been accomplished in the past by providing bidirectional information bus lines which carry information first in one direction, and then in another direction, thus avoiding duplication of the signal lines. The number of bus lines required is further reduced in prior microprocessors by multiplexing the address of the peripheral device on the data bus and synchronizing the output of both address and data on the output buses. Furthermore, data transfer control signals have been encoded to simplify read and write input/output and memory operations, thus resulting in reduced pin requirements. In addition to a line carrying system clock signals, a typical microprocessor interface would include the following lines:

Two status signal lines are utilized to encode the status of the data transfer, read, write, halt, or fetch. One control line is utilized to indicate whether the device being addressed is a memory device or an I/O device. One line is utilized by an external device to signal a request that the device needs the address and data bus. Another line from the microprocessor indicates to the external device that the abovementioned request has been acknowledged. A separate line is utilized by the peripheral to generate an interrupt request. A single line is utilized by the microprocessor to latch address information into the peripheral device. An 8-bit address bus and a separate 8-bit data bus complete the minimum lines necessary for this type of interface. If a 16-bit address is utilized, the data bus carries a portion of the address word during an address cycle. In a subsequent cycle this bus is used to carry data.

As seen from the above, it takes 23 lines to provide the functions described.

As more and more complex functions are incorporated on a microprocessor chip, the number of pins dedicated to input/output functions becomes more critical. This is particularly true where large microprocessors are partitioned between two or more chips. This means that more and more pins have to be dedicated to interchip control signals, thus making fewer pins available for input/output operations. It is therefore desirable to further reduce the number of bidirectional information bus lines and other pins utilized while maintaining a simplified data transfer protocol between the microprocessor and peripheral units.

BRIEF SUMMARY OF THE INVENTION

Briefly, the present invention utilizes a single bidirectional address/control/data bus in combination with two simplex control lines to perform all complex address control and data transfer functions. This is accomplished by assigning different functions to these lines during sequential cycles of a data transfer operation. During a first cycle the bus carries a control data specification and the low order bits of the peripheral address. The control specification is encoded to provide information indicating the type of access (memory device or I/O device), the direction of data transfer (read or write), the length of data to be transferred (1 byte, 2 bytes, etc.), and modifier bits which further define the type of access being undertaken. Interprocessor communication (IPC) is signaled during this first cycle by lowering the simplex control line from the peripheral device to the microprocessor.

During the second cycle the remainder of the address information is placed on the bus and the simplex line from the microprocessor to the peripheral is asserted to indicate that valid data is on the bus. Subsequent cycles are utilized to transfer data (up to 16 bits at a time) until the total number of bytes has been transferred. During these multiple cycles the simplex line from the peripheral device to the microprocessor is asserted high to indicate that valid data is on the bus during a read cycle or that data has been accepted during a write cycle. Error information is signaled at the end of a read or write cycle by holding this particular simplex line low.

Sophisticated data communication messages are transferred by means of an interprocessor communication mechanism which is more fully described in copending patent application Ser. No. 972,010 entitled "Interprocessor Communications Apparatus" by George Cox and Justin Rattner, filed on Dec. 21, 1978.

The invention has the advantage that in one transaction a variable-length data transfer takes place with the transmission of only one set of address and control specification information. Prior microprocessors are constrained to issue data transfer requests which are closely related to the physical width of the memory (8 or 16 bits). The present invention encodes a complex data transfer request into a compact two-cycle control specification, which may direct an external unit (such as a memory) to transfer up to 20 bytes of information.

A further advantage of the invention is that address information does not have to be maintained on a separate bus for the several cycles during which data is transferred because the length information indicates to the peripheral device the number of bytes to be stored in the address specified during the first and second cycle. Thus the address information can be latched in the peripheral and the address bus used to transfer data.

A further advantage of the invention is that simplex lines for encoding status information and information indicating whether the peripheral device is a memory or an I/O device can be eliminated because this information is placed directly on the data bus during the first cycle of an operation.

The invention has the further advantage that only two simplex lines are needed to synchronize data and to perform error functions and interprocessor communication functions because these lines are assigned different meanings at different times during the cycles of a complete operation.

It can thus be seen that the present invention performs a complex information transfer operation over an interface by using a bare minimum of signal lines.

BRIEF DESCRIPTION OF THE DRAWINGS

The foregoing and other objects, features and advantages of the invention will be apparent from the following detailed description of a preferred embodiment of the invention as illustrated in the accompanying drawings wherein:

FIG. 3 is a table setting forth the control specifications for the address, control, and data bytes;

FIG. 4 is a more detailed block diagram of those components of the instruction unit shown in FIG. 1 which are necessary for an understanding of the present invention;

FIG. 5 is a block diagram of those components of the execution unit shown in FIG. 1 which are necessary for an understanding of the present invention;

FIG. 6 is a block diagram of those components of the bus interface unit shown in FIG. 1 which are necessary for a complete understanding of the present invention;

FIG. 7 is a timing diagram which shows the nominal read timing;

FIG. 8 is a timing diagram which shows the minimum read timing;

FIG. 9 is a timing diagram which shows a nominal write timing; and,

FIG. 10 is a timing diagram which shows a minimum write timing.

DESCRIPTION OF THE INVENTION

Figure 1:
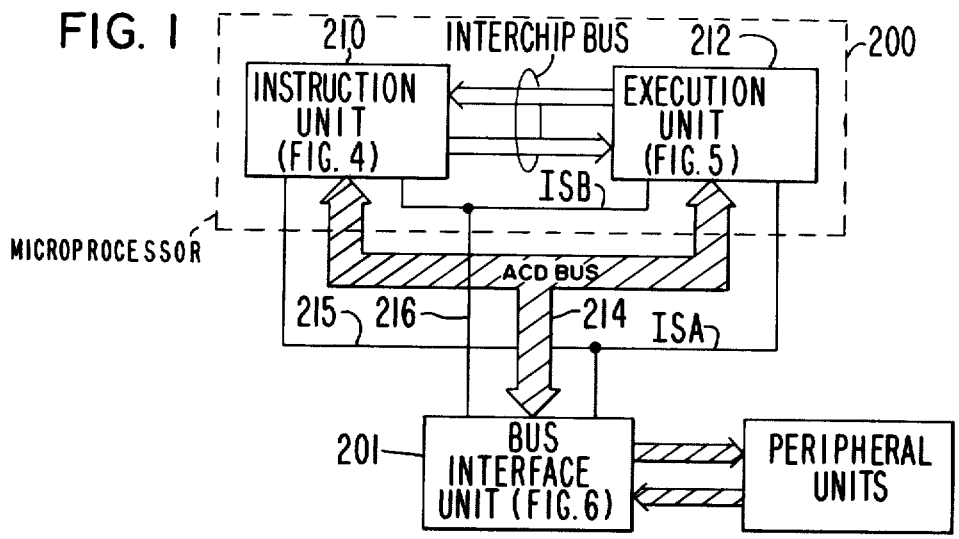
FIG. 1 is a functional block diagram illustrating the various components of a microprocessor in which the invention is embodied.

FIG. 1 is a block diagram of a microprocessor in which the present invention is embodied. The overall system is more fully described in copending patent application entitled "Data Processing System" by Steven R. Colley, et al, application Ser. No. 971,661, filed on Dec. 21, 1978. As more fully described in the above-referenced application, a microprocessor 200 is attached to a bus interface unit 201 which provides for interface control of data transfers between the processor 200 and other units such as memories, I/O devices, or other processors in the system.

The microprocessor is comprised of two separate chips, one for the instruction unit 210, and the other for the execution unit 212. Communication between the instruction unit and the execution unit is over an inter-chip bus. The instruction unit is shown in more detail in FIG. 4 and the execution unit is shown in more detail in FIG. 5. The logic shown in these figures is only that which is necessary for an understanding of the present invention. A more detailed description of these two units is found in the above-identified Colley et al patent application.

Figure 6:
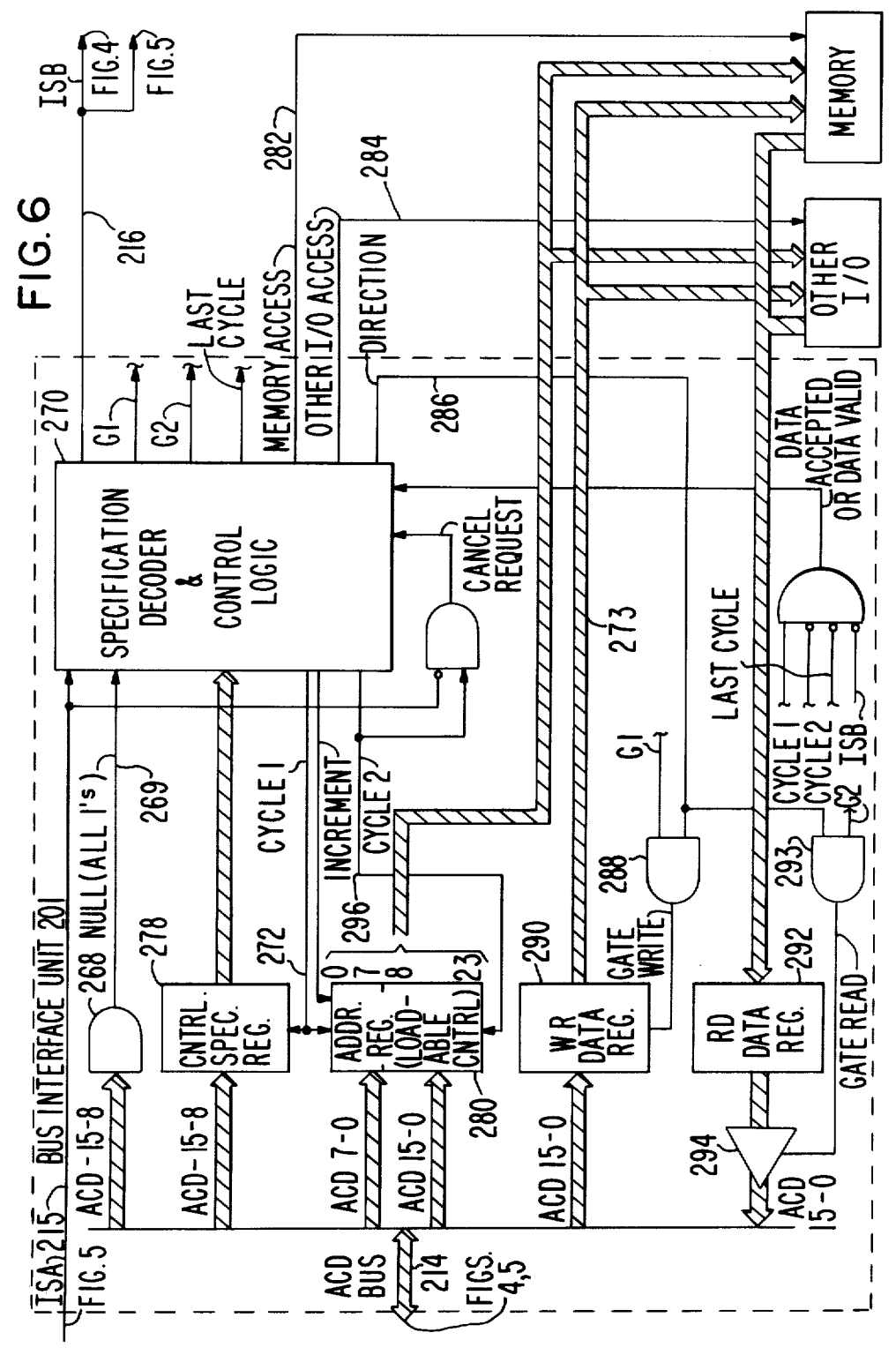

Off-chip communication with external processors, memories, or peripheral devices is accomplished by means of an interface which communicates with a bus interface unit 201 more fully described in FIG. 6. The interface lines as a minimum are comprised of a clock line (CLKA not shown in FIG. 1), an address/control/data bus 214 which includes a plurality of bidirectional lines, a simplex line (ISA) 215 from the execution unit 212 to the instruction unit 210 and the bus interface unit 201, and a simplex line (ISB) 216 from the bus interface unit 201 to the instruction unit 210 and the execution unit 212. It should be understood that the processor 200 could be implemented on a single chip, and that the present invention is not limited to the specific two-chip configuration shown in FIG. 1.

Interface Lines and their Functions

ACD 15-0

These 16 lines comprise a bidirectional address/control/data bus. The lines are output from the execution unit to indicate the action desired to the bus interface. In the other direction, the bus is input to the instruction unit and the execution unit from the bus interface to carry information read in.

ISA

Figure 2:
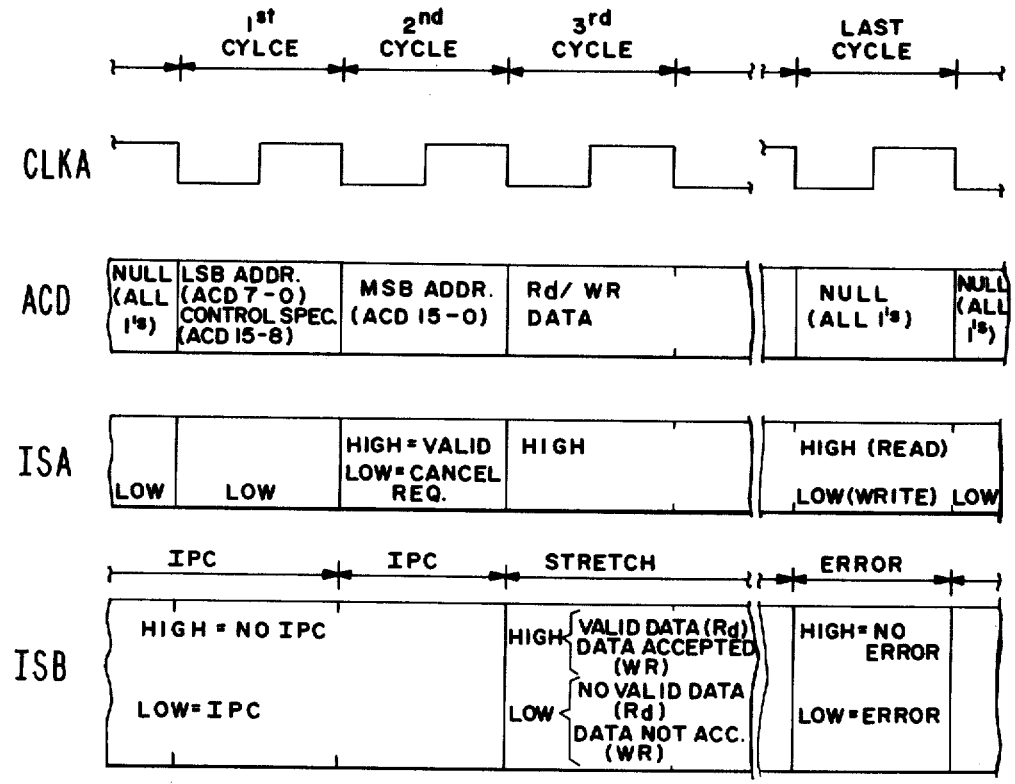
FIG. 2 is a timing diagram which shows the functions of the various interface lines during various cycles of a data transfer operation.

The ISA line 215 is output from the execution unit to the instruction unit and the bus interface unit. Referring to FIG. 2, ISA is low whenever no transaction is taking place between the processor and external units. ISA is high whenever a transaction is under way, such as during the second cycle when address data is on the ACD bus and the third and subsequent cycles when read or write data is being transferred. ISA is low for the first cycle of a transaction when lines 15-8 of the ACD bus carry a control specification and when ACD 7-0 carry the low 8 bytes of the address for memory references.

ISA is high during the second cycle when the high order 16 address bits of a memory reference are on the ACD bus. During this cycle a request is canceled by asserting ISA low. ISA is low during the last cycle of a write operation (which may serve also as the first cycle of the subsequent transaction).

ISB

ISB is a simplex line from the bus interface unit to both the instruction unit and the execution unit. ISB can have three different types of significance depending upon the cycle during which it is asserted. ISB has either interprocessor communication (IPC) significance, stretch significance, or error significance.

Whenever ISA is low, ISB has IPC significance, for example, during the first and second cycles shown in FIG. 2. Whenever ISA is low, ISB has IPC significance except in the first cycle following a write type of transaction (as specified by bit 14 of the control specification shown in FIG. 3), in which event ISB has error significance.

ISB also has IPC significance in the first cycle of a transaction during which ISA is high, for example, during the second cycle shown in FIG. 2. Thereafter ISB has stretch significance for the remainder of the time ISA is high except in the last cycle of a read transaction when it has error significance.

Stretch significance means that read or write data is stretched over several cycles depending upon the length of data to be transferred as specified by bits 10, 11, and 12 in the control specification, FIG. 3.

Referring now to FIG. 2, the basic operation of the interface will now be described. For simplicity of illustration, only one bus interface unit is shown connected to the interface. It is understood that more than one bus interface unit can be utilized in the practice of the present invention. Timing synchronization between the units shown in FIG. 1 is provided by a clock signal (CLKA) which is connected to each of the units. A read or write operation takes place over several clock cycles. Prior to the start of a read or write operation the ACD bus is energized by the execution unit to generate all ones (called a "null" specification). ISA is asserted by the execution unit during this period. ISB is normally asserted high by the bus interface unit to indicate that there is no interprocessor communication message waiting to be transferred to the processor 200. The function of the IPC operation is more fully described in the above-mentioned copending patent application entitled "Interprocessor Communication Apparatus" by George Cox and Justin Rattner. The execution unit commences a data transfer operation in response to an access memory type of microinstruction received from the instruction unit 210. The execution unit 212 generates the physical address of the reference and issues the least significant byte of the address along with control information specifying the type of reference and the number of bytes to be transferred. The control specification is shown in detail in the table of FIG. 3. The bus interface unit monitors the ACD bus. When it changes from a "null" specification, then the bus interface clocks the least significant byte of address and the control specification into registers in the bus interface unit 201. During the second cycle the execution unit places the most significant byte of address information on the ACD bus and asserts ISA high to indicate to the bus interface unit that the address information is now on the bus. The execution unit is able to cancel the request by asserting ISA low (instead of high) during this second cycle, which will be interpreted by the bus interface as a canceled request signal, even though information may still be on the ACD bus.

The processor 200 may issue requests for one, two, four, six, eight, ten, sixteen, or twenty bytes of data to be transferred. This length information is part of a control field which was transmitted during the first cycle of the transaction. As the data bytes are returned from memory (for a read request), they are buffered and aligned by the bus interface unit and transferred to the processor 200 in the correct order. During the third cycle of a write transaction, the execution unit places write information on the ACD bus, holds ISA asserted high and waits for ISB to be asserted high, thus indicating that the bus interface unit has accepted the write data. If data transfer is to be in the opposite direction, the execution unit waits during the third cycle until ISB is asserted high. This indicates that the bus interface unit has placed read data on the ACD bus and that the data is valid. Cycles similar to that described for the third cycle are repeated until all the bytes of data indicated by the length control specification generated during the first cycle are received. During the last cycle a "null" (all ones) is generated on the ACD bus and ISA is brought low by the execution unit to end the write operation. An error is signaled by ISB being asserted low by the bus interface unit. During a read operation ISA is brought low in the cycle following the last cycle and ISB again has error significance in the last cycle. In this manner, ISA is used to signal the end of a write operation by going from high to low during the last cycle of a write operation. ISA is held asserted high during a read operation for the last cycle during which time ISB has error significance. During a write operation the execution unit places all ones on the ACD bus during the last cycle and asserts ISA low. ISB is then used to signal an error condition, high for no error and low for error.

The logic for performing the interface functions just described is shown in more detail in FIGS. 4, 5, and 6. Only those portions concerned with controlling interface sequences will be discussed so that the present invention can be more easily understood. A much more detailed description of the operation of the various units is given in the above-identified Colley et al patent application. Wherever possible throughout this specification the same reference numerals are used to identify the same system blocks shown in the aforementioned application.

Referring to FIG. 4, the instruction unit is a macroinstruction decoder which decodes an instruction stream and transfers the microinstructions necessary to execute the stream to the execution unit of FIG. 5 over the interchip bus. In addition, the instruction unit also transfers logical address information to holding registers in the execution unit. The execution unit, described subsequently, decodes and executes the microinstructions received from the instruction unit.

The instruction unit is comprised of two main blocks, the instruction decoder 222 and the microinstruction sequencer 224. The instruction decoder (ID) receives instructions from the ACD bus 214 and latches them into the instruction decoder by means of the valid instruction fetch data line 221 which is generated by the microinstruction sequencer in response to the state of the ISA and ISB interface lines. The ID interprets the fields of the instruction and generates the microinstructions (or starting address for the longer microinstruction routines) which are necessary to execute the macroinstruction. In addition, the ID formats logical address information for subsequent transfer to holding registers on the execution unit.

The microinstruction sequencer (MIS) 224 contains the control circuitry for sequencing through the various microinstruction flows necessary to execute the macroinstructions. The MIS receives starting addresses for microinstruction routines from the ID, decodes the microinstructions from a microprogrammed ROM to control the microprogrammed sequencing, and transfers the microinstructions over the interchip bus to the execution unit where they are executed. By monitoring ISA and ISB, the microinstruction sequencer is able to determine when valid data is on the ACD bus 214. For example, when ISA is high after the second cycle of a data transfer, ISB is asserted high to indicate that valid read information is on the bus. In response to this indication the microinstruction sequencer MIS generates a signal on the line 221 to thereby energize AND circuit 223 thus gating information on the ACD bus into the instruction decoder 222.

Referring now to FIG. 5, the microinstruction stream is received by the execution unit over the interchip bus. The interchip bus is connected to logic block 225 which includes the data manipulation unit (DMU), reference generation unit (RGU), and control unit (CU) logic which is fully described in the above-described Colley et al patent application.

Briefly, the DMU performs arithmetic, logical, and execution operations on data brought in during the course of program execution. The RGU builds 24-bit physical addresses from logical addresses in the macroinstruction and issues addresses. The control unit receives microinstructions from the instruction unit, retains them, and exercises the DMU and the RGU. Many other functions are performed by the logic 225; however, for purposes of this specification, only those functions which pertain to the operation of the present invention are shown in FIG. 5.

The execution unit drives a "null" specification on the ACD bus whenever there is no transaction in progress by energizing line 236 which forces all ones onto the ACD bus lines. Also, ISA is forced low. Once the execution unit receives an access memory type of microinstruction from the instruction unit, it generates the physical address of the reference and stores it in address register 238. The least significant byte of the address is outputted to GATE circuit 240. The most significant bytes in the remainder of the address are outputted to GATE circuit 242. The logic 225 also composes control information specifying the type of reference and the number of bytes to be transferred, whether the operation is a read or write operation along with certain modifier bytes shown and described previously with respect to FIG. 3. This control specification is stored in a control specification register 244. The control specification register is outputted to GATE circuit 246. During cycle one, generated by the logic 225, GATE circuits 240, 246 are energized to thus gate the low order byte of the address from address register 238 along with the control specification to the ACD bus 214. At the same time the logic 225 asserts the ISA line 215 low.

During the next cycle, the logic 225 energizes the cycle two line and disenergizes the cycle one line. This causes GATE circuit 242 to be energized, thus forcing the most significant bytes of the remainder of the address, stored in register 238, onto the ACD bus. At the same time the logic 225 asserts the ISA line 215 high. A request is canceled (e.g., due to a bounds violation) by asserting ISA low at this time.

The execution unit monitors the ISB line, 216, from the bus interface unit. A low on the ISB line when a bus transaction is not in progress (ISA is low) indicates to the processor that there is an interprocessor communication (IPC) waiting for it. The logic for performing this function is comprised of OR circuit 252, and AND circuit 254. ISB has IPC significance whenever ISA is low, and during the first cycle (cycle two) that ISA is high except when ISB has error significance, which is during the last cycle of a transaction. In that situation when ISB is asserted high, this indicates a no error condition out of AND circuit 256.

ISB is also used by the bus interface to indicate bus errors to the processor. ISB has error significance during the last cycle of a transaction. A low on ISB when it has error significance, AND circuit 256, indicates to the processor that a bus error was detected during the transaction.

During a bus transaction (ISA high), ISB has "stretch" significance whenever it does not have IPC or error significance. This is represented by the logic of AND circuit 259, which energizes AND circuits 258 and 260 whenever it is not cycle one, but cycle two, or not the last cycle of an operation. Under these conditions ISB is given stretch significance. Thus, during a read operation, an output from AND circuit 258 indicates to the logic 225 that valid data has been placed by the bus interface onto the ACD bus. Similarly, during a write operation, an output from AND circuit 260 indicates (ISB high) that data has been accepted by the bus interface unit.

If the bus interface has not accepted the write data, the processor keeps the data on the ACD bus until it is accepted.

As stated previously, if a read transaction is an instruction fetch, the data is latched into the instruction unit. If the read transaction is a data fetch, the data is latched into the execution unit by energizing data fetch line 262 which gates the information on the ACD bus into data register 266. Write transactions are initiated only by the execution unit.

The bus interface unit shown in FIG. 6 terminates and monitors the ACD bus 214 and the ISA line 215. AND circuit 268 detects a "null" pattern and provides an output signal, 269, to the specification decoder and control logic 270. When the interface changes from the null specification (of all ones or some other predetermined bit pattern), an output, 269, is generated and the specification decoder and control logic energizes cycle one line, 272, in response thereto. This line gates the ACD bus into the control specification register 278 and the least significant byte portion of the address register, loadable counter, 280. The control register is decoded. Depending upon the coding of the bits in accordance with FIG. 3, either the memory access line 282 is energized or the other access line, 284, is energized. Further, the direction line 286 is energized for a write operation of deenergized for a read operation. If a write operation is indicated, AND circuit 288 is energized to gate subsequent data into the write data register 290, via gate signal G1. If a read operation is indicated, data is gated from the read data register 292 through driver circuit 294 onto the ACD bus under control of AND circuit 293 and gate signal G2.

During cycle 2 line 296 is energized, thus gating the most significant bits of the address into the most significant bits portion of the address register, loadable counter, 280. The memory address in counter 280 is accepted by the memory module via a memory-address bus if a memory access 282 is indicated. Otherwise, the address is accepted by another module. Similarly, the write data register output 273 is accepted by the memory if a memory access is specified, or by another module if a memory access is not specified. The increment line from logic 270 to the loadable counter 280 increments the counter to provide sequential addresses corresponding to sequential bytes of data to be moved, as specified by bits 10, 11, and 12 in the control specification, FIG. 3.

Two additional outputs are provided, buffer in (BIN) and buffer out (BOUT), FIG. 5, to control bus transceivers to buffer and isolate the processor from other processors. The use of buffers may be desired in systems with heavy pin loading. BIN is asserted low when information is to enter the instruction unit or the execution unit on the ACD bus. BOUT is asserted high when information is to leave the execution unit on the ACD lines. The timing of BOUT and BIN is shown in FIGS. 7 and 8.

In FIG. 7 a 32-byte read access is shown. Since the ACD bus is two bytes in width (i.e., 16 bits), two read data cycles are necessary to transfer the information. Initially the ACD bus is asserted "null" (all ones). The execution unit receives a 32-byte read access on the ICB (interchip bus). In response to this, it generates part of the address and a control specification during cycle one of the transaction.

During cycle two the execution unit raises ISA and places the remainder of the address on ACD. The execution unit lowers BOUT and BIN, thus energizing the input buffers. As soon as the interface unit has fetched the data from the memory address specified, it places the data on the ACD bus and asserts ISB positive during cycle five. It then lowers ISB and fetches the next data byte, taking into consideration the length information specified by the control bytes. The interface unit places the second two bytes of data on ACD and again raises ISB.

During the last cycle ISB has error significance and is asserted low if an error has been detected by the bus interface unit.

BIN and BOUT are asserted high at the end of the read transaction by the execution unit.

FIG. 8 is a timing diagram illustrating a minimum read timing. Here the read access would be for one or two bytes of data.

FIG. 9 is a timing diagram illustrating nominal write timing for a 32-bit write access. During cycle one part of the address and the entire control specification is placed on ACD. During cycle two ISA is asserted high and the remainder of the address is placed on ACD. During cycle three write data is placed on the ACD bus by the execution unit and the execution unit maintains the write data on the bus until the bus interface unit asserts ISB high. ISB asserted high indicates that the bus interface unit has accepted the write data. The execution unit can now place the second two bytes of write data on the ACD bus. The bus interface unit responds by asserting ISB high which is an indication to the execution unit that it can remove the write data from the ACD bus and go on to the next access. During the last cycle ISB has error significance.

FIG. 10 illustrates the minimum write timing. During the last cycle (which may be the first cycle of the next transaction) the ISB line has error significance.

It will be understood from the foregoing description of the various embodiments that additional modifications and changes in form and details may be made without departing from the spirit and scope of the invention as claimed.

What is claimed is:

1. A bus interface unit for use in combination with a microprocessor interface of the type having
   a bidirectional multiline bus for carrying address bits, control bits and data bits, said bus having a total number of lines which is less than the total number of bits comprising said address;
   an output line (ISA);
   an input line (ISB);
   means connected to said bus, operative during a first cycle for placing a first number of bits of said address on a first number of said bus lines, and a control specification specifying the direction of data transfer and the amount of data to be transferred, said control specification being placed on a second number of said bus lines; and,
   means connected to said bus operative during a second cycle following said first cycle for placing a second number of bits of said address on said first number and said second number of said bus lines, said data transfer to take place, to or from a location specified by said address, during cycles subsequent to said first and second cycles;
   said bus interface unit comprising:
   logic means connected to said output line (ISA) and to said first number and said second number of said bus lines, said logic means including first and second address registering means, said logic means operative in response to said output line (ISA) and to said first number of bits of said address on said first number of bus lines and to said control specification of said second number of bus lines, during said first cycle, for decoding said control specification and for registering said first number of bits of said address, in said first address registering means, said logic means being further operative in response to said output line (ISA) during said second cycle for registering said second number of bits of said address, in said second address registering means, whereby a complete address comprised of said first and second number of bits is registered by the end of said second cycle;
   first means connected to said logic means and to said multiline bus for controlling the direction of said data transfer on said multiline bus; and,
   second means connected to said logic means and to said multiline bus for controlling the amount of data transferred on said multiline bus,
   said first and second controlling means being operative in accordance with control information contained in said control specification.

2. The bus interface unit in accordance with claim 1 further comprising:
   means included in said logic means and connected to said output line (ISA), operative during a decoded read and a decoded write operation specified by said control information for asserting said input line (ISB) in each cycle subsequent to said second cycle to thereby indicate to said microprocessor interface that valid data has been placed on said bus during a read operation and to indicate that data has been accepted during a write operation.

3. The bus interface unit in accordance with claim 1 wherein said bus interface unit is capable of being connected to a memory module in which data may be accessed at said address, said bus interface unit further comprising:
  a memory address bus for connecting said bus interface unit to said memory module; and
  means connecting said first and second address registering means to said memory address bus for providing, to said memory module, said complete memory address comprised of said first number of bits and said second number of bits of said address.

4. The bus interface unit in accordance with claim 3 wherein said first and second address registering means in combination comprise a loadable counter, said loadable counter capable of being incremented in response to energization of an increment input thereto,
  said logic means further including means for decoding said control specification specifying the amount of data to be transferred and means for energizing said increment input to said loadable counter, whereby sequential memory addresses may be provided to said memory address bus in accordance with the amount of data to be transferred specified in said control specification.

5. An interface logic for use in combination with a microprocessor having
  a single, bidirectional, multiline bus comprised of a number of lines which is less than the number of lines necessary to carry a complete address word;
  a first simplex line;
  a second simplex line;
  means connected to said multiline bus, operative during a first cycle for placing a first number of bits of said address on a first number of said bus lines, and an encoded control specification, said control specification specifying the direction of data transfer and the amount of data to be transferred, said control specification being placed on a second number of said bus lines; and,
  means connected to said multiline bus, operative during a second cycle following said first cycle, for placing a second number of bits of said address on said first number and said second number of said bus lines, said data transfer to take place to or from a location specified by said address, during cycles subsequent to said first and second cycles;
  said interface logic comprising:
  first means for receiving from said microprocessor said encoded control specification on said bus during said first cycle of information transfer between said microprocessor and said interface logic over said bus, said control specification specifying the type of access, the direction of transfer, and the length of data to be moved;
  second means connected to said first simplex line (ISA) from said microprocessor, responsive to said first simplex line during a cycle subsequent to said first cycle for indicating to said interface logic that a bus transaction is underway;
  third means for energizing said second simplex line (ISB) into said microprocessor, said second simplex line (ISB) being energizable to indicate, when in a first state, that valid data has been placed on said bus by said interface logic, and, when in a second state, that valid data has been accepted from said bus by said interface logic, respectively, during a read operation or a write operation;
  said first means for receiving further comprising an address register including a first portion and a second portion; and,
  fourth means responsive to signals on said bus for gating a first number of said bus lines to said first portion of said address register during said first cycle of operation of said bus,
  said fourth means including fifth means for gating a second number of said bus lines to said second portion of address register during a cycle of operation of said bus subsequent to said first cycle;
  whereby a complete address may be constructed sequentially during successive cycles of operation of said bidirectional bus.

6. The interface logic in accordance with claim 5 wherein said first means for receiving an encoded control specification comprises:
  means connected to said bidirectional bus for detecting a predetermined pattern of energization of said bidirectional bus lines, and
  means operative upon detection of said pattern for starting said first cycle of information transfer on said bus.

7. The interface logic in accordance with claim 5 further comprising:
  a memory module;
  a memory address bus connected to said memory module and to said address register;
  read and write logic means connected between said bidirectional bus and said memory module for controlling the direction of data transfer between said bidirectional bus and said memory module; and,
  wherein said means for receiving an encoded control specification includes means for decoding said control specification to provide signals to said memory module, to said address register, and to said read and write logic means, to control, respectively, the type of access, the direction of data transfer between said bidirectional bus and said memory module, and the length of data to be moved.

8. The interface logic in accordance with claim 7 wherein said address register comprises a loadable counter, and said means for receiving an encoded control specification includes means for decoding said control specification to provide a signal for incrementing said counter to provide sequential addresses to said memory module over said memory address bus, said addresses corresponding to sequential bytes of data being moved between said bidirectional bus and said memory module.

9. The interface logic in accordance with claim 5 wherein said means for receiving an encoded control specification includes further means responsive to energization of said second simplex line (ISB) for generating cycles of a read or write operation wherein said second simplex line (ISB) has status significance other than that valid data has been placed on said bus or accepted from said bus, respectively, during said read or write operation.

* * * * *

UNITED STATES PATENT AND TRADEMARK OFFICE
CERTIFICATE OF CORRECTION

PATENT NO. : 4,315,308
DATED : February 9, 1982
INVENTOR(S) : Daniel K. Jackson

It is certified that error appears in the above-identified patent and that said Letters Patent are hereby corrected as shown below:

Column 10, line 40, which reads "cation of said second number of bus lines, during", should read --cation on said second number of bus lines during--.

Signed and Sealed this

Twenty-second Day of June 1982

[SEAL]

Attest:

Attesting Officer

GERALD J. MOSSINGHOFF

Commissioner of Patents and Trademarks